(12) United States Patent
Hölle

(10) Patent No.: US 10,195,897 B2
(45) Date of Patent: Feb. 5, 2019

(54) BEARING FOR SUPPORTING ROLLER

(71) Applicant: Blickle Räder + Rollen GmbH u. Co. KG, Rosenfeld (DE)

(72) Inventor: Rolf Hölle, Rosenfeld (DE)

(73) Assignee: Blickle Rader + Rollen GmbH U. Co. KG, Rosenfeld (DE)

( * ) Notice: Subject to any disclaimer, the term of this patent is extended or adjusted under 35 U.S.C. 154(b) by 0 days.

(21) Appl. No.: 15/740,751

(22) PCT Filed: Jun. 28, 2016

(86) PCT No.: PCT/EP2016/065061
§ 371 (c)(1),
(2) Date: Dec. 28, 2017

(87) PCT Pub. No.: WO2017/001432
PCT Pub. Date: Jan. 5, 2017

(65) Prior Publication Data
US 2018/0186182 A1 Jul. 5, 2018

(30) Foreign Application Priority Data
Jun. 30, 2015 (DE) .................... 20 2015 103 436 U

(51) Int. Cl.
*A47B 91/00* (2006.01)
*B60B 33/04* (2006.01)
(Continued)

(52) U.S. Cl.
CPC ........ *B60B 33/045* (2013.01); *B60B 33/0055* (2013.01); *B60B 35/004* (2013.01);
(Continued)

(58) Field of Classification Search
CPC ..... B60B 33/045; Y10S 16/36; Y10T 16/184; Y10T 16/212
(Continued)

(56) References Cited

U.S. PATENT DOCUMENTS 4,312,096 A 1/1982 Schubert et al.
6,279,199 B1 * 8/2001 Plate ..................... B60R 33/045
280/47.12
(Continued)

FOREIGN PATENT DOCUMENTS

CN 2839006 Y 11/2006
CN 202378631 U 8/2012
(Continued)

OTHER PUBLICATIONS

International Search Report dated Oct. 14, 2016 for PCT/EP2016/065061.
(Continued)

*Primary Examiner* — Toan C To
(74) *Attorney, Agent, or Firm* — Jones Day

(57) ABSTRACT

Bearing for at least one supporting roller of a carriage, which supporting roller is supported on at least one bearing surface, comprising at least one axle device which can be rotated about at least one rotational axis, at least one rocker which is connected to the axle device such that it is reliably driven, wherein, at an end which lies opposite the axle device, the rocker has at least one first connecting device for connecting the rocker to the supporting roller, at least one spring device which is arranged mechanically between the axle device and/or the rocker on one side and at least one holding device on the other side, wherein a force which forces the supporting roller onto the bearing surface can be built up on the axle device and the rocker by means of the spring device, and at least one damping device, by means of which a rotational movement of the axle device about the rotational axis can be damped, characterized in that the spring device and the damping device are configured in one piece at least in regions by way of at least one torsion spring element which is of rubber-elastic configuration at least in regions.

14 Claims, 1 Drawing Sheet

(51) Int. Cl.
- *B60B 35/00* (2006.01)
- *B60B 35/04* (2006.01)
- *B62B 3/06* (2006.01)
- *B60B 33/00* (2006.01)
- *F16F 13/04* (2006.01)

(52) U.S. Cl.
CPC ............ *B60B 35/007* (2013.01); *B60B 35/04* (2013.01); *B62B 3/06* (2013.01); *F16F 13/04* (2013.01); *B60B 2900/115* (2013.01); *B60B 2900/325* (2013.01); *B62B 2301/044* (2013.01); *B62B 2301/20* (2013.01)

(58) Field of Classification Search
USPC ................ 280/124.128, 124.13, 124.137
See application file for complete search history.

(56) References Cited

U.S. PATENT DOCUMENTS

| | | | |
|---|---|---|---|
| 6,425,161 B1 | 7/2002 | LeMeur et al. | |
| 7,055,835 B2* | 6/2006 | Wo | A61G 5/0473 280/86.1 |
| 2006/0071440 A1* | 4/2006 | Fought et al. | B62K 3/002 280/124.128 |
| 2009/0309331 A1 | 12/2009 | Ryan | |
| 2010/0230182 A1* | 9/2010 | Otto | B60B 33/045 180/6.48 |
| 2016/0340162 A1* | 11/2016 | Standard et al. | B62B 5/00 280/124.128 |

FOREIGN PATENT DOCUMENTS

| | | |
|---|---|---|
| DE | 19807849 | 9/1999 |
| DE | 202006020569 | 1/2009 |
| DE | 102013112633 | 5/2015 |
| EP | 1147968 | 10/2001 |
| EP | 1253023 | 10/2002 |
| FR | 928454 | 11/1947 |

OTHER PUBLICATIONS

Written Opinion dated Oct. 14, 2016 for PCT/EP2016/065061 with English Translation.
German Search Reported dated Mar. 17, 2016 for DE 202015103436.9.

* cited by examiner

BEARING FOR SUPPORTING ROLLER

CROSS-REFERENCE TO RELATED APPLICATIONS

This application is a National Phase application of International Application No. PCT/EP2016/065061, filed Jun. 28, 2016, which designates the United States, and claims priority to German Application No. DE 202015103436.9, filed Jun. 30, 2015. These applications, in their entirety, are incorporated herein by reference.

FIELD OF THE DISCLOSURE

The present invention relates to a bearing for at least one supporting roller of a carriage, which supporting roller is supported on at least one bearing surface, comprising at least one axle device which can be rotated about at least one rotational axis, at least one rocker which is connected to the axle device such that it is reliably driven, wherein, at an end which lies opposite the axle device, the rocker has at least one first connecting device for connecting the rocker to the supporting roller, at least one spring device which is arranged mechanically between the axle device and/or the rocker on one side and at least one holding device on the other side, wherein a force which forces the supporting roller onto the bearing surface can be built up on the axle device and the rocker by means of the spring device, and at least one damping device, by means of which a rotational movement of the axle device about the rotational axis can be damped.

BACKGROUND OF THE DISCLOSURE

Various bearings for supporting rollers of a vehicle are known from the prior art.

Thus, DE 10 2013 112 633 A1 discloses a pedestrian controlled pallet truck. Said pedestrian controlled pallet truck comprises a chassis, which has a coupling torsion bar. The coupling torsion bar is rotatably mounted around a coupling torsion bar axis, wherein reversing levers as well as wheel links are furthermore arranged on the coupling torsion bar axis.

Such a coupling torsion bar is also known from EP 1 147 968 B2, which discloses a forklift truck with a five wheel chassis. Said forklift truck comprises a generic bearing. In this case, two supporting rollers are coupled to a coupling rod by means of respective bearing components. Said coupling rod is mounted in a frame of the lift truck so it can rotate around a horizontal axis. A central stabilizer spring, which is supported on the frame of the forklift truck, is proposed. Said spring acts on the coupling point in such a way that a downward compressive force is transmitted onto the supporting rollers, wherein a damping element damping the rotation of the coupling rod additionally interacts with the coupling rod. A hydraulic damper is proposed as the damping element. Furthermore, a torsion bar is proposed as the stabilizer spring. Said torsion bar is arranged in the hollow coupling rod and is connected to a torque support at a first end. On the opposing end, the torsion bar is arranged in a cylindrical component, which is welded in the coupling rod, and connected thereto so that it is reliably driven rotationally. To make it possible to connect the torsion spring to the torque support, it is proposed that the torsion bar be mounted in the coupling rod by means of two sliding bushings so that a relative movement of the coupling rod to the torsion bar is facilitated in the region of the sliding bushing. However, the disadvantage of this generic bearing is that it has a very complicated structure, in particular a plurality of individual components, such as the sliding bushings and the hydraulic damper, are required.

Finally, DE 198 07 849 A1 discloses a forklift truck with adjustable supporting rollers. It is proposed that supporting rollers be fastened to a coupling rod via bearing components, which facilitate a vertical rotation of the supporting rollers. The coupling rod is mounted in bearings so that it is horizontally rotatable, wherein the rotation takes place against a restoring force built up by a pre-tensioning cylinder. This bearing of a forklift truck also has a complicated structure due to the number of individual components. This increases the susceptibility to errors and therefore reduces the failure safety of the bearing.

As a result, the problem of the present invention is to further develop the generic bearing such that the disadvantages of the prior art are overcome, in particular to make a bearing available that has a simple structure and therefore a lower susceptibility to error.

SUMMARY OF THE DISCLOSURE

This problem is solved according to the invention in that the spring device and the damping device are configured in one piece at least in regions by way of at least one torsion spring element which is of a rubber elastic configuration at least in regions.

It is thereby also proposed with the invention that the supporting roller comprises at least one roller element which can be rotated around at least one rolling axis, wherein the roller element is preferably mounted in at least one roller fork, in particular the roller fork is mounted around at least one pivot axis which runs substantially perpendicularly to the rolling axis and/or the rotational axis, wherein the pivot axis and the rolling axis preferably intersect or run in a skewed manner in relation to each other.

In addition, a bearing according to the invention can be characterized in that the vehicle is configured in the form of at least a trailer, at least a load truck and/or at least a lift truck, preferably a forklift truck, in particular with a five wheel chassis, and/or comprises at least one support structure, such as at least one support frame, wherein the holding device is preferably supported on the mechanical side facing away from the spring device at least indirectly on the support structure, in particular is connected to the support structure.

Especially preferred embodiments of the bearing can be characterized in that the rotational axis runs substantially perpendicularly to the normal direction of the bearing surface.

In addition, it is proposed for the bearing that said bearing comprise a plurality of rockers connected to the axle device and/or a plurality of supporting rollers, wherein every rocker comprises at least one first connecting device for connection to at least one supporting roller and/or for connecting the rocker to at least two supporting rollers and/or the bearing is comprised of at least one coupling torsion bar.

In addition, the invention proposes that the axle device on one side and the rocker and/or rockers on the other side are connected to one another by means of at least one second connecting device, wherein the second connecting device preferably comprises at least one connection acting in a force fitting, form fitting, and/or integrally bonded manner, in particular at least one welded connection, screw connection, snap-on connection, plug connection and/or press connection.

It is also preferred that the spring device comprises at least one thermosetting, thermoplastic and/or elastomer material, such as polyurethane, ethylene propylene diene monomer (EPDM), caoutchouc and/or rubber.

In addition, a bearing according to the invention can be characterized in that the spring device is connected to the axle device and/or the rocker or at least one rocker by means of at least one, preferably at least one holding element comprising a third connecting device, wherein the third connecting device preferably comprises at least one connection acting in a force fitting, form fitting, and/or integrally bonded manner, in particular at least one welded connection, adhesive connection, vulcanized connection, tongue and groove connection, connection comprising at least one projection engaging in at least one recess, plug connection, snap-on connection and/or press connection, wherein the spring device preferably is connected to the holding element in an integrally bonded manner and/or the holding element is connected to the rocker and/or the axle device in a form fitting manner.

Especially preferred embodiments of the invention provide that the axle device and/or the rocker comprise, in particular in the region of the second connecting device, at least one metallic material and/or, in particular in the region of the third connecting device, at least one plastic material, preferably a hard plastic material.

In this case, it is especially preferred that the spring device is connected to the holding device by means of at least one fourth connecting device, wherein the fourth connecting device preferably comprises at least one force fitting, form fitting, and/or integrally bonded connection, in particular at least one welded connection, adhesive connection, vulcanized connection, tongue and groove connection, connection comprising at least one projection engaging in at least one recess, plug connection, snap-on connection and/or press connection.

Furthermore, the invention proposes that the holding device, in particular in the region of the fourth connecting device, and/or the holding element comprise at least one plastic material, in particular a hard plastic material, such as polyamide.

An especially preferred embodiment of the bearing provides that the damping device comprises at least one friction element, which is connected to the axle device and/or the rocker so that it is reliably driven rotationally and is supported on at least one friction surface of the holding device and/or spring device.

In the case of the foregoing embodiment, it is especially preferred that a frictional force, with which the friction element is supported on the friction surface, can be changed by means of at least one adjusting element.

Finally, it is proposed for the invention that the spring device is penetrated at least in regions by the rocker and/or the axle device, wherein preferably the friction surface is configured on a side of the spring device facing away from the third connecting device.

Therefore, the invention is based on the surprising discovery that due to the fact that a spring device, which was configured in the prior art in particular as a torsion spring bar, the structure of the bearing, in particular a coupling torsion bar, can be considerably simplified by a rotational spring element or a torsion spring element being configured in regions of at least a rubber elastic material such as polyurethane. In particular, the use of a rubber elastic rotational spring element makes it possible for a damping device to be configured by a friction damper, which is supported on the rotational spring element so that the rotational spring element also forms the damping device in regions. Therefore, the spring device and the damping device are configured in one piece at least in regions.

"In one piece" is to be understood that a component that is configured in one piece cannot be detached non-destructively. Therefore, a component that is connected to the rotational spring element in an integrally bonded manner or by means of an adhesive connection, such as the holding device and/or the holding element, is also configured in one piece with the spring device. Therefore, within the meaning of the invention, the spring device can be configured as a multi-component part, in which a rubber elastic element is configured with one or a plurality of elements connected therewith, preferably by means of a material connection and/or adhesion. A surface of the holding device that is connected in an integrally bonded manner to the rubber elastic region of the spring device, which surface acts as a friction surface, must then be allocated to the spring device within the meaning of the invention.

Despite simplifying the structure of the spring device, the one piece configuration, however, simultaneously makes it possible for the damping properties to be substantially freely modifiable despite the fact that the spring function and damping function are integrated into one component. In particular, the configuration of the spring device as a rubber elastic rotational spring element makes it possible for a multi-component plastic part to be formed, which makes the springy bearing on the holding frame of the vehicle possible and simultaneously comprises modifiable damping properties.

Thus, it is proposed in particular that the spring device is configured so it is integrally bonded to a holding device, via which a fastening on the support structure of the vehicle is facilitated. On the other hand, the spring device is connected to the coupling torsion bar in a form fitting manner, in particular by means of a holding element preferably connected thereto in an integrally bonded manner.

Because of a torsion of the rotational spring element between the holder and the axle device or the rocker of the coupling torsion bar, it is possible to build up a restoring force on the supporting rollers fastened to the rocker. In this case, the force is determined by the geometry and the material of the rotational spring. At the same time, the spring device also acts as a friction partner for a friction element, wherein a contact pressure of the friction element on the spring device can be modified and consequently the damping properties are modifiable.

In this regard, it is especially preferred that an axle device of the coupling torsion bar penetrates the spring device at least in regions, preferably together with the holding device. While a transfer of the spring forces of the spring device takes place via the integrally bonded connection between the holding device and the rotational spring element and the form fitting connection between the rotational spring element and the rocker, the contact pressure of the friction element on a friction surface can be modified via a screw connection of the friction element with the axle device.

This results overall in a compact and structurally simple design so that the construction volume required for the spring device and the damping device can be reduced considerably and at the same time an improved failure safety can be achieved.

Additional features and advantages of the invention are yielded form the following description, in which an exemplary embodiment of the invention is explained based on schematic drawings.

DETAILED DESCRIPTION OF THE DISCLOSURE

Figure 1:
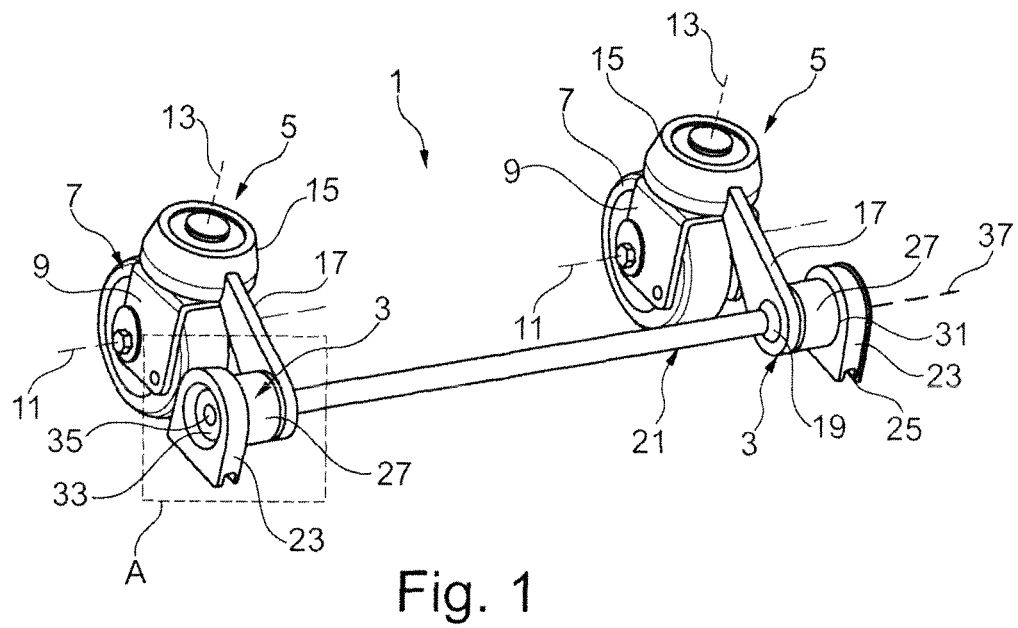
FIG. 1 A perspective view of a coupling torsion bar comprising a bearing according to the invention.

FIG. 1 depicts a coupling torsion bar 1 according to the invention. The coupling torsion bar 1 comprises two bearings 3 according to the invention. The bearings 3 make it possible for the supporting rollers 5 to rest on a bearing surface (not shown) with a prescribed contact pressure. The supporting rollers 5 are configured as supporting rollers that can pivot freely. In this case, the supporting rollers 5 comprise roller elements 7, which are mounted in a roller fork 9 so they can rotate around a rolling axis 11. The roller fork 9 is mounted in turn in a first connecting device 15 so that it can pivot around a pivot axis 13.

The respective supporting roller 5 is connected to a rocker 17 by means of the first connecting device 15. The rocker 17 is in turn connected to an axle device 21 so that it is reliably driven rotationally in an integrally bonded manner by means of a second connecting device in the form of a welded connection 19.

Figure 2:
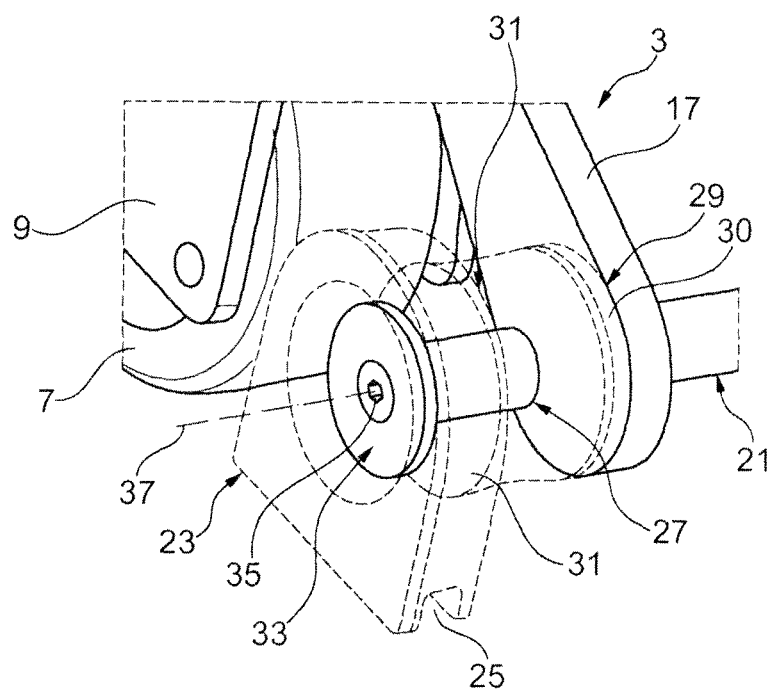
FIG. 2 A detailed view of the coupling torsion bar in FIG. 1 in accordance with Section A.

As FIG. 2 in particular shows, the bearing 3 comprises a holding device 23, by means of which the coupling torsion bar 1 can be connected to a support structure (not shown) of the vehicle. For this purpose, the holding device 23 comprises connecting elements 25.

The bearing 3 comprises in particular a spring device 27 arranged mechanically between the holding device 23 and the rocker 19 or the axle device 21. The spring device 27 is configured as a rotational spring element, which comprises a polyurethane material in regions. The spring device 27 is connected in a reliably rotationally driven manner to the rocker 17 and thereby to the axle device 21 via a second connecting device 29. For this purpose, the third connecting device comprises at least one holding element 30 preferably comprising polyamide, which is connected to the spring device 27 in an integrally bonded manner. In particular, a form fitting connection is made between the rocker 17 and the end of the spring device 27 facing the rocker 17, in particular the holding element 30 connected in an integrally bonded manner with said end. In alternative embodiments, the rubber elastic region of the spring device 27 can also be directly connected in a form fitting manner to the rocker 17 or to the axle device 21. For this purpose, the axle device 21 and/or the rocker 17 can be surrounded for example in regions by the rubber elastic material of the spring device, in particular by means of overmolding.

Furthermore, the spring device 27 is connected to the holding device 23 by means of a third connecting device 31. In the process, the holding device 23 consists of a plastic material, in particular a hard plastic material such as polyamide, and a connection between the spring device 27 and the holding device 23 is accomplished via an integrally bonded connecting device 31. Consequently, the holding device 23 is configured to be one piece with the spring device 27 because of the material connection.

Overall, the spring device 27 in this example thus constitutes a multi-component plastic part configured in one piece within the meaning of the invention, comprising the region comprising a rubber elastic material, at which the holding device 23 and the holding element 30 are fastened by means of a material connection. In other words, the spring device 27 thus comprises the holding device connected in an integrally bonded manner and the holding element connected in an integrally bonded manner.

As FIG. 2 also shows, the spring device 27 is penetrated by the axle device 21. The spring device 27 thus sits rotatably on the axle device 21, wherein the transfer of the spring forces is accomplished via the integrally bonded connection between the holding device 23 and the rubber elastic region of the spring device 27 as well as via the form fitting connection of the holding element 30, which is connected in an integrally bonded manner to the rubber elastic region of the spring device 27, with the rocker 17 or the axle device 21.

A friction element 33 is fastened on the end of the axle device 21 facing away from the rocker 17. A contact pressure of the friction element 33 on the surface of the holding device 23 acting as the friction surface can be modified via a screw connection 35. By modifying the contact pressure by means of the screw connection 35, it is possible to change the effect of the friction element 33 acting as a friction damper and thereby change a damping of the rotational movement of the axle device 21 around a rotational axis 37. The spring device 27, more precisely the holding device 23 of the spring device, thus provides a friction partner of the friction damping.

In alternative embodiments (not shown), the friction element 33 can also rest directly on a surface of the rubber elastic region of the spring device 27, which then acts as the friction surface. For this purpose, the holding device comprises a corresponding recess for accommodating the friction element.

In contrast to the coupling torsion bars known from the prior art, the invention makes it possible for a spring device, by means of which the coupling torsion bar is fastened to a support structure of the vehicle, to be configured structurally in a simple manner, in that the spring device is configured by a multi-component plastic part in the form of a rotational spring element.

Thus, the spring effect of the spring device is determined by the dimension and the material of the rotational spring element. This determination can change independent of the damping properties of the damping device, which is partially configured in one piece with the rotational spring element. Thus, the spring device interacts with a friction element, which acts a friction damper.

The features disclosed in the foregoing description, in the claims and in the drawings can be essential for the invention in the various embodiments thereof both individually as well as in any combination thereof.

LIST OF REFERENCE SIGNS

A Section
1 Coupling torsion bar
3 Bearing
5 Supporting roller
7 Roller element
9 Roller fork
11 Rolling axis
13 Pivot axis
15 Connecting device
17 Rocker
19 Welded connection
21 Axle device
23 Holding device
25 Connecting element
27 Spring device
29 Connecting device
30 Holding element
31 Connecting device
33 Friction element
35 Screw connection
37 Rotational axis

The invention claimed is:

1. A bearing for at least one supporting roller of a carriage, which supporting roller is supported on at least one bearing surface, comprising
   at least one axle device which can be rotated about at least one rotational axis, at least one rocker which is connected to the axle device such that it is reliably driven, wherein, at an end which lies opposite the axle device, the rocker has at least one first connecting device for connecting the rocker to the supporting roller,
   at least one spring device which is arranged mechanically between the axle device or the rocker on one side and at least one holding device on the other side, wherein a force which forces the supporting roller onto the bearing surface can be built up on the axle device and the rocker by means of the spring device, and
   at least one damping device, by means of which a rotational movement of the axle device about the rotational axis can be damped,
   wherein the spring device and the damping device are configured in one piece at least in regions by way of at least one torsion spring element which is of a rubber elastic configuration at least in regions.

2. The bearing according to claim 1, wherein the supporting roller comprises at least one roller element which can be rotated around at least one rolling axis, wherein the roller element is mounted in at least one roller fork, and the roller fork is mounted around at least one pivot axis which runs substantially perpendicularly to the rolling axis or the rotational axis, wherein the pivot axis and the rolling axis preferably intersect or run in a skewed manner in relation to each other.

3. The bearing according to claim 1, wherein the vehicle is configured in the form of at least a trailer, at least a load truck or at least a forklift truck with a five wheel chassis, or comprises at least one support structure, wherein the holding device is supported on the mechanical side facing away from the spring device at least indirectly on the support structure and is connected to the support structure.

4. The bearing according to claim 1, wherein the rotational axis runs substantially perpendicularly to the normal direction of the bearing surface.

5. The bearing according to claim 1, further comprising a plurality of rockers connected to the axle device or a plurality of supporting rollers, wherein every rocker comprises at least one first connecting device for connection to at least one supporting roller or for connecting the rocker to at least two supporting rollers or the bearing is comprised of at least one coupling torsion bar.

6. The bearing according to claim 1, wherein the axle device on one side and the rocker or rockers on the other side are connected to one another by means of at least one second connecting device, wherein the second connecting device comprises at least one connection acting in a force fitting, form fitting, or integrally bonded manner, or at least one welded connection, screw connection, snap-on connection, plug connection or press connection.

7. The bearing according to claim 1, wherein the spring device comprises at least one thermosetting, thermoplastic or elastomer material.

8. The bearing according to claim 1, wherein the spring device is connected to the axle device and/or the rocker or at least one rocker by means of at least one, at least one holding element comprising a third connecting device, wherein the third connecting device comprises at least one connection acting in a force fitting, form fitting, or integrally bonded manner, or at least one welded connection, adhesive connection, vulcanized connection, tongue and groove connection, connection comprising at least one projection engaging in at least one recess, plug connection, snap-on connection or press connection, wherein the spring device is connected to the holding element in an integrally bonded manner or the holding element is connected to the rocker or the axle device in a form fitting manner.

9. The bearing according to claim 1, wherein the axle device or the rocker comprise, in particular in the region of the second connecting device, at least one metallic material and/or, in particular in the region of the third connecting device, at least one plastic material, preferably a hard plastic material.

10. The bearing according to claim 1, wherein the spring device is connected to the holding device by means of at least one fourth connecting device, wherein the fourth connecting device comprises at least one force fitting, form fitting, or integrally bonded connection, or at least one welded connection, adhesive connection, vulcanized connection, tongue and groove connection, connection comprising at least one projection engaging in at least one recess, plug connection, snap-on connection or press connection.

11. The bearing B ring according to claim 1, wherein the holding device, in particular in the region of the fourth connecting device, or the holding element comprise at least one plastic material, a hard plastic material, or a polyamide.

12. The bearing according to claim 1, wherein the damping device comprises at least one friction element, which is connected to the axle device or the rocker so that it is reliably driven rotationally and is supported on at least one friction surface of the holding device or spring device.

13. The bearing according to claim 12, wherein a frictional force, with which the friction element is supported on the friction surface, can be changed by means of at least one adjusting element.

14. The bearing according to claim 1, wherein the spring device is penetrated at least in regions by the rocker or the axle device, wherein the friction surface is configured on a side of the spring device facing away from the third connecting device.

* * * * *